Figure 1:
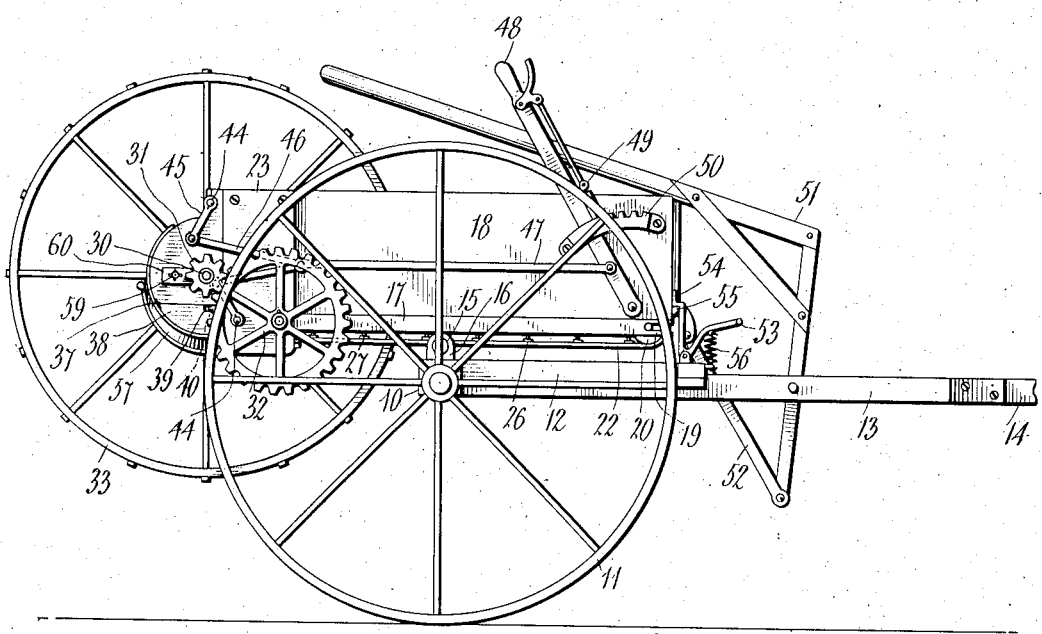

G. W. BARROW.
MANURE DISTRIBUTER AND DUMP CART.
APPLICATION FILED APR. 22, 1909.

947,538.

Patented Jan. 25, 1910.

4 SHEETS—SHEET 1.

Witnesses

Inventor
George W. Barrow
By
Attorneys

G. W. BARROW.
MANURE DISTRIBUTER AND DUMP CART.
APPLICATION FILED APR. 22, 1909.
947,538.
Patented Jan. 25, 1910.
4 SHEETS—SHEET 2.
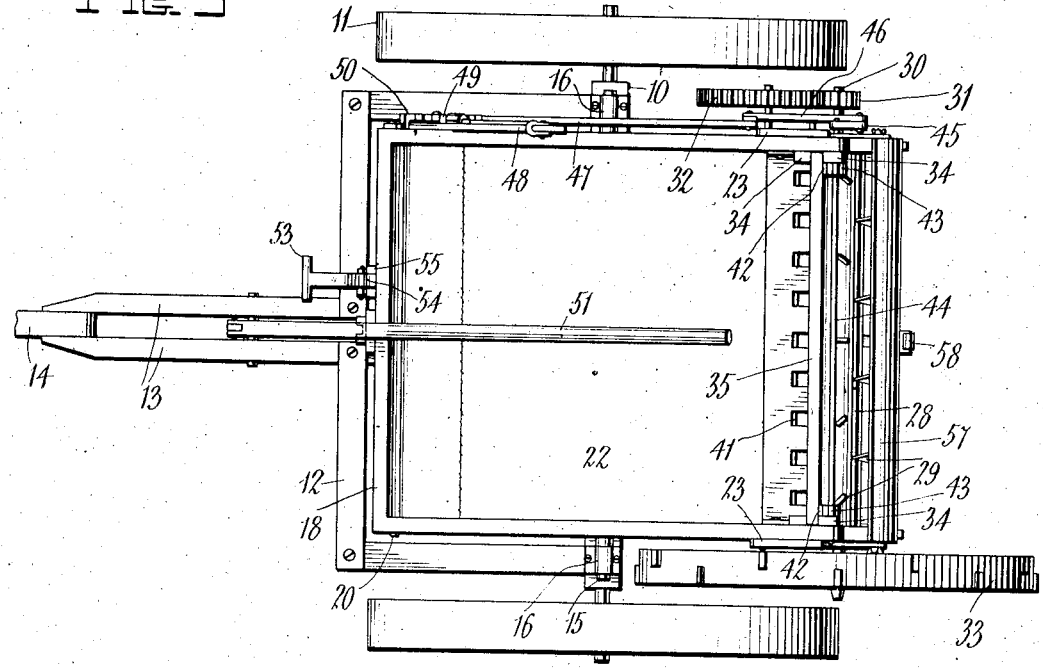
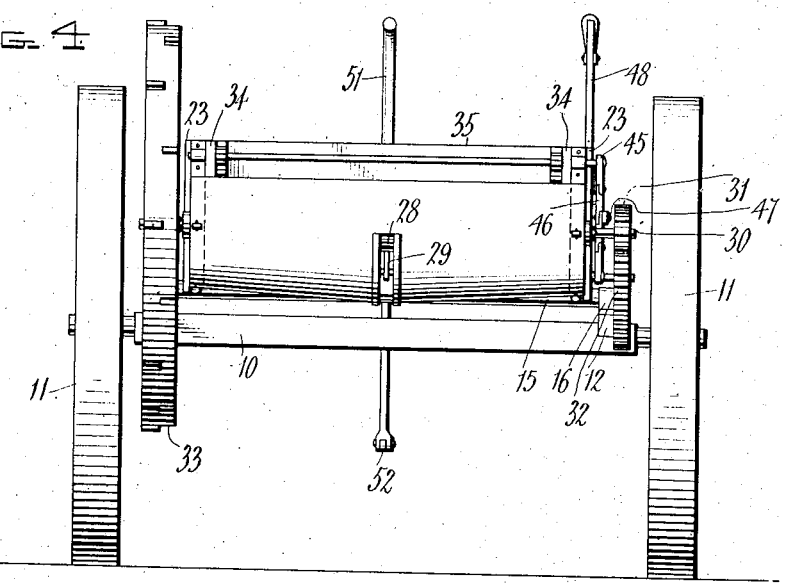
Witnesses
Inventor
George W. Barrow
By
Attorney

G. W. BARROW.
MANURE DISTRIBUTER AND DUMP CART.
APPLICATION FILED APR. 22, 1909.

947,538.

Patented Jan. 25, 1910.
4 SHEETS—SHEET 3.

Witnesses

Inventor
George W. Barrow
By
Attorneys

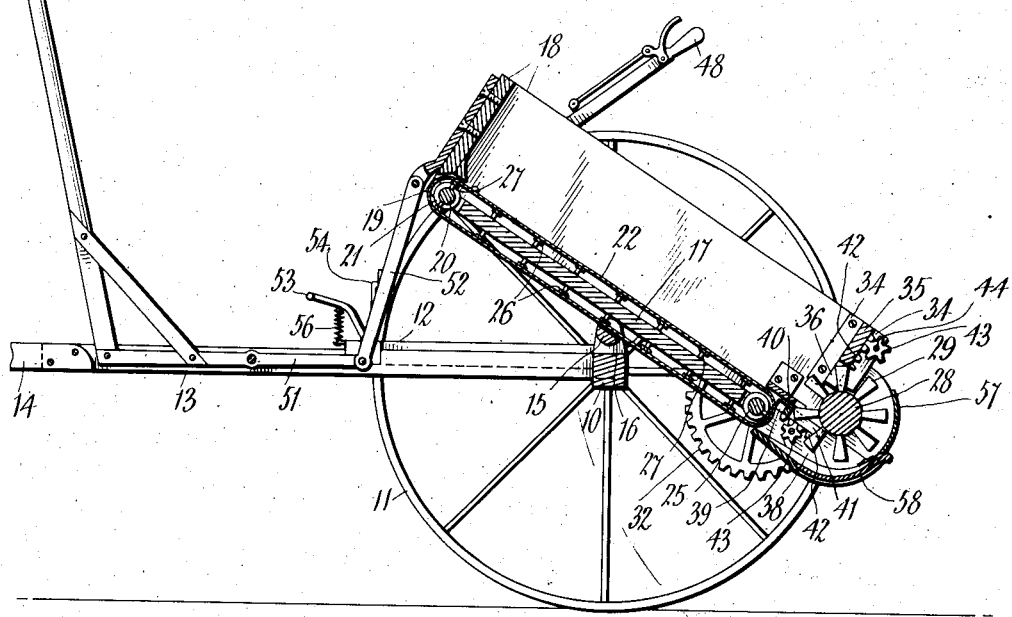
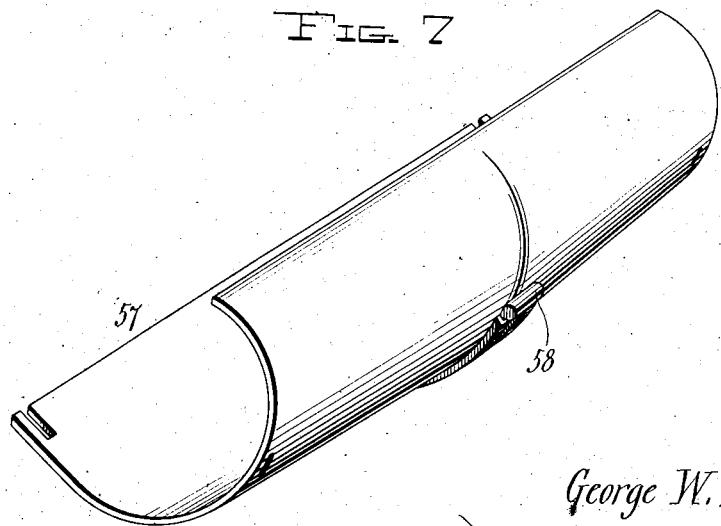

UNITED STATES PATENT OFFICE.

GEORGE W. BARROW, OF RATCLIFF, ARKANSAS.

MANURE-DISTRIBUTER AND DUMP-CART.

947,538.     Specification of Letters Patent.     Patented Jan. 25, 1910.

Application filed April 22, 1909. Serial No. 491,523.

*To all whom it may concern:*

Be it known that I, GEORGE W. BARROW, a citizen of the United States, residing at Ratcliff, in the county of Logan, State of Arkansas, have invented certain new and useful Improvements in Manure-Distributers and Dump-Carts; and I do hereby declare the following to be a full, clear, and exact description of the invention, such as will enable others skilled in the art to which it appertains to make and use the same.

The invention relates to a fertilizer distributer, and more particularly to the class of manure distributers and dump carts.

The primary object of the invention is the provision of a distributer of this character in which the load of material may be evenly and uniformly distributed over a field, and means for automatically effecting the distribution of such material, which means is at all times under the control of the teamster or operator.

Another object of the invention is the provision of a distributer of this character in which the body thereof is supported for dumping action under the control of the teamster or operator, and which body supports a ground roller or wheel which contacts with the ground upon the lowering or dumping of the body so as to operate a spreader roller and an endless conveyer to enable the contents of the body to be evenly and uniformly deposited upon the ground during the travel of the distributer thereover, and means for regulating the distribution at the will of the teamster or operator.

Another object of the invention is the provision of a distributer of this character in which the distributing elements are readily and easily detachable so that the machine may be utilized as an ordinary dump cart.

A further object of the invention is the provision of a distributer of this character which is simple in construction, thoroughly efficient in operation and inexpensive in the manufacture.

In the drawings accompanying and forming part of this specification is illustrated the preferred form of embodiment of the invention, which to enable those skilled in the art to practice the invention, will be set forth at length in the following description, while the novelty of the invention will be included in the claims succeeding the description. It is to be understood however that changes, variations and modifications may be made within the scope of the invention as covered by the claims hereunto appended without departing from the spirit of the invention.

Figure 2:
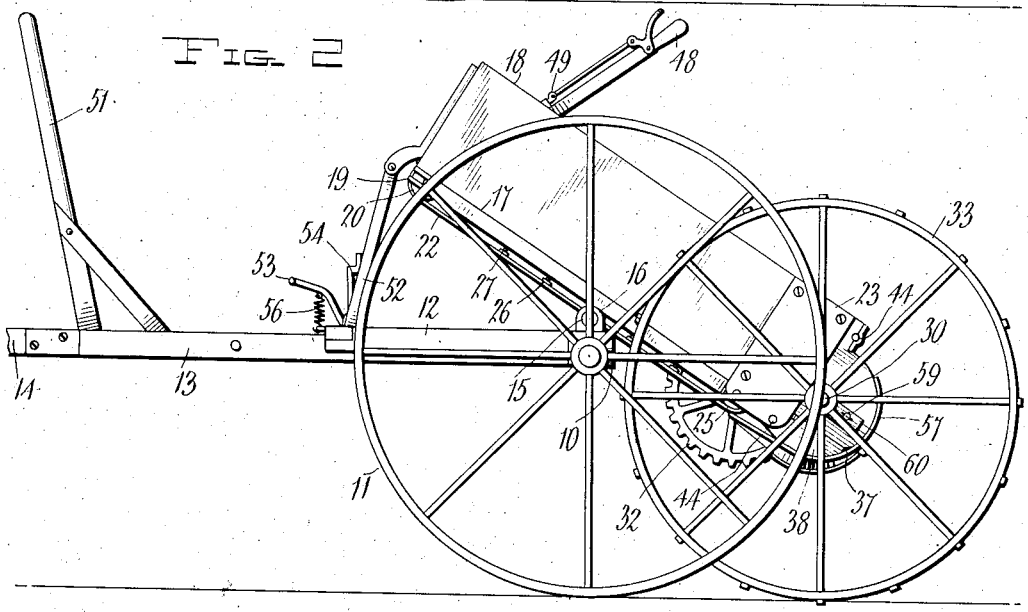
Figure 5:
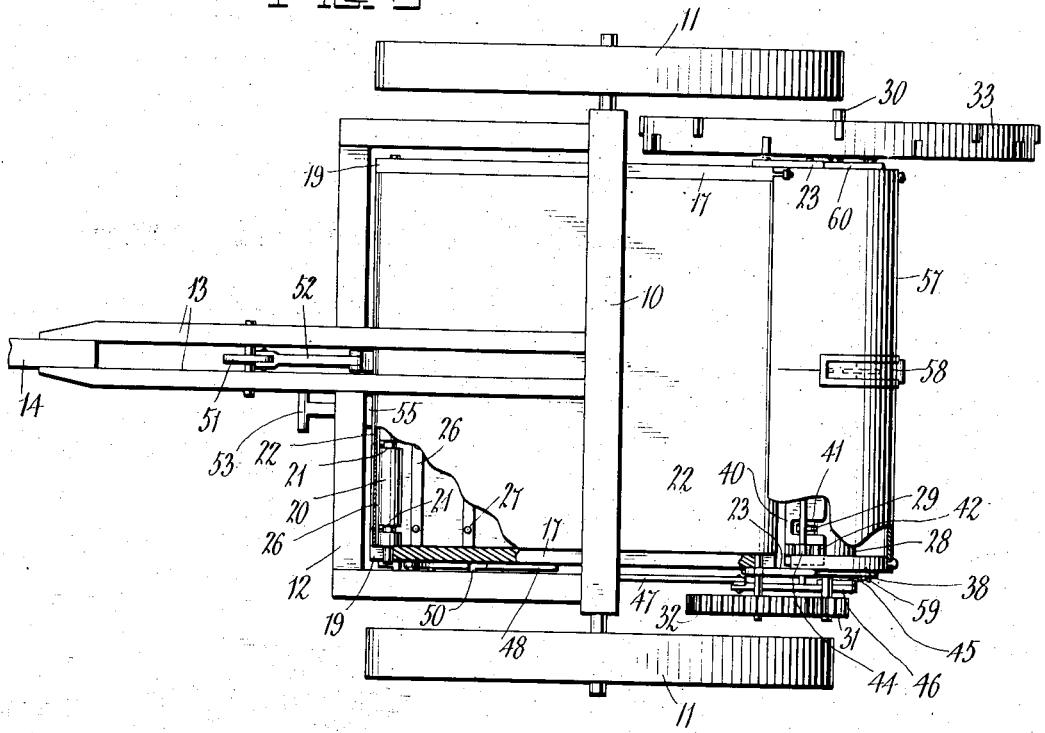
Figure 8:
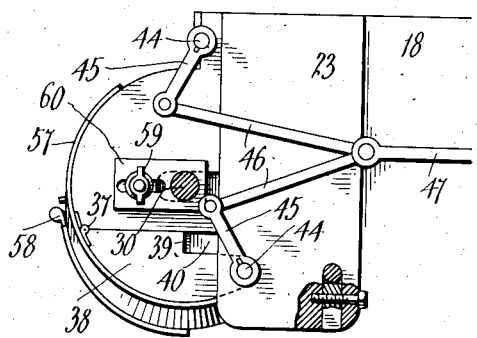

In the drawings:—Figure 1 is a side elevation of the invention. Fig. 2 is a reverse side elevation with the cart in a dumping position. Fig. 3 is a top plan view. Fig. 4 is a rear end elevation. Fig. 5 is a bottom plan view. Fig. 6 is a longitudinal sectional view. Fig. 7 is a detail perspective view of the guard or shield plate removed. Fig. 8 is a fragmentary detail view of the regulating connections and their mounting at the rear end of the dumping body.

Similar reference characters indicate corresponding parts throughout the several views in the drawings.

In the drawings the numeral 10 designates an axle beam supporting at its spindle extremities traction wheels 11, which latter are of the usual and ordinary construction; secured to and projecting forwardly from the axle beam 10, is a supporting frame 12, to which latter and the said axle beam are connected centrally located spaced draft bars 13, the same being disposed in parallel relation to each other in a horizontal plane and between the forward ends of which is secured a draft pole or tongue to which are adapted to be attached draft animals for the transportation of the machine.

Superimposed upon the supporting frame 12, is a dumping cart or wagon body which has its journal 15, mounted in suitable bearings 16, fixed to the said supporting frame, and which body comprises a bottom 17, vertical sides and a front wall 18, the corners united in a well known manner, and with an open discharge end. The forward end of the bottom 17, is transversely recessed and formed with notch extensions 19, to receive the reduced journal ends of a removable roller 20, which contains throughout its length spaced annular grooves 21, and over this roller is trained a conveyer in the form of a canvas belt or strip 22, the meeting ends of which are suitably detachably connected to provide an endless conveyer which is capable of being removed at the will of an operator. Secured to the exterior faces of the vertical sides of the body near the rear extremity of the latter are plates 23, in which are mounted the journal ends of a detachable roller 25, the same having spaced annular grooves alining with and corresponding to the grooves of the other roller and over which roller is also trained the conveyer. Secured to the inner face of the conveyer strip at intervals are transverse bars 26, which have mounted thereon friction rollers 27, the same being adapted to travel upon the faces of the bottom and in the grooves of the rollers 20 and 25 respectively, when the conveyer is being operated.

Mounted at the rear end of the dumping body is a rotatable spreader roller 28, the same having a series of radially projecting fingers or teeth 29 arranged in staggered relation to each other. The said spreader roller 28, has its spindle extremities 30, extending beyond the sides of the dumping body and to one of which is fixed a pinion 31, enmeshing with a gear 32, detachably fixed to one spindle extremity of the roller 25, so that upon rotation of the spreader roller the latter will impart movement to the conveyer. Detachably secured to the other spindle extremity of the spreader roller 27, is a ground wheel 33, the latter adapted to be brought into contact with the ground upon the dumping of the body so as to drive the spreader roller and conveyer during the travel of the machine.

Secured to the inner faces of the sides of the body near the rear thereof are spaced vertical cleats or guide strips 34, between which is mounted for vertical sliding adjustment a regulating plate or tail piece 35 which contains at its lower edge a series of notches or recesses 36, positioned to permit the passage of the fingers or teeth 29 thereto during the rotation of the spreader roller. Connected to the ends of the sides 18, of the body by hinges 37, are semicircular pieces or sections 38, which latter contain alining recesses 39, to accommodate the ends of an adjustable regulating plate 40, disposed between said sections and sides of the body. This plate contains a series of notches 41, to accommodate and permit the free passage of the fingers or teeth 29 therethrough when the spreader roller is operated. It is obvious these hinge sections 38 will permit the ready and easy attachment of the regulating plate 40, when desired. Each of said regulating plates is formed with toothed racks 42, enmeshing with rack pinions 43, the same fixed in pairs upon rotatable rods or shafts 44, suitably journaled in the dumping body and each of which shafts is formed with a crank extremity 45, both being connected by pivot links 46, with a pitman 47, which latter is pivotally connected to a manually operable throw lever 48, mounted at the forward end of the dumping body. Carried by the throw lever 48, is a manually releasable locking device 49, which normally engages a tooth segment 50, mounted on the body to hold the regulating plates in adjusted position.

Pivotally mounted between the spaced draft bars 13, is an L-shaped lever 51, the latter connected by a link 52, to the forward end of the dumping body, so that upon operating the lever 51, the said body can be brought to a raised or dumping position at the will of an operator or teamster.

Pivoted to the supporting frame 12, is a foot operable lever or treadle 53, the latter formed with a catch extremity 54, adapted to be brought into locked engagement with a keeper 55, on the dumping body to hold the latter against dumping movement. Acting upon said foot lever or treadle is a spring 56, which holds it in normal locking position to prevent dumping of the body until the said treadle or foot lever is released by the operator or teamster.

Suitably detachably mounted at the open or the discharge end of the dumping body is a curved shield or guard plate 57, which latter is positioned upon the body when loaded to prevent the contents thereof from being discharged while the body is in a raised or non-dumping position.

Contained in the shield or guard plate 57 centrally thereof is an elongated opening through which is discharged a stream of fertilizer or other material when it is desired to deposit such material in an open furrow or adjacent a single row of plants. The said opening is adapted to be normally closed by a slide 58, when the machine is in an inoperative position and transporting material from one locality to another.

It is clearly apparent that by the nature and manner of the mounting of the distributer parts or elements the same may be disconnected from the dumping body when not required for immediate service, thereby admitting of the body being utilized in its ordinary capacity for draft or haulage purposes.

From the foregoing description of the construction and operation of the invention it is thought a clear understanding of the same will be apparent and therefore a more extended explanation has been omitted.

It is obvious that by having the gear 32 detachably connected to the roller 25, it will permit the substitution of varying size gears to be connected to the roller 25, so as to enable the increase or decrease of speed of travel of the endless conveyer as may be found desirable.

To permit the enmeshing of the pinion 31 with a gear of increased or decreased size with respect thereto in lieu of the gear 32, the spindle extremities are journaled in elongated slots of the dumping body and to the latter are adjustably secured by set screws 59, shiftable plates 60 which engage the spindle extremities 30 and hold the same against displacement in said slots and in proper position to have the pinion in one spindle extremity engage the gear or the roller 25, of the conveyer.

What is claimed is:—

1. In a machine of the class described, a wheeled frame, a tilting body mounted upon the frame, an endless conveyer extending the length of the body, a spreader disposed at one end of the conveyer and supported by the body, means operative when the body has been brought to tilted position for actuating simultaneously the spreader and conveyer, means regulating the distribution of the contents from the body, means for raising and lowering the body, and foot operable means normally locking the body against tilting movement.

2. In a machine of the class described, a wheeled frame, a tilting body mounted upon the frame, an endless conveyer extending the length of the body, a spreader disposed at one end of the conveyer and supported by the body, means operative when the body has been brought to tilted position for actuating the spreader and conveyer in unison, means regulating the distribution of the contents from the body, means for raising and lowering the body, foot operable means normally locking the body against tilting movement, and means to permit adjustment of the distribution regulating means.

3. In a machine of the class described, a main supporting frame, traction wheels supporting said frame, a tilting body mounted upon the supporting frame, and having a solid bottom, rollers detachably mounted at opposite ends of the body in the plane of the bottom thereof, an endless conveyer trained over said rollers and having friction rollers working upon said bottom, a detachable spreader roller journaled in said body at its discharge end, radially projecting fingers carried by said spreader roller, regulating plates mounted at the discharge end of the body, manually operable means for adjusting the plates, a ground wheel operating said spreading roller upon the tilting of the body, connections between the spreader roller and one of the conveyer rollers, and a detachable shield plate mounted at the discharge end of the body.

4. In a machine of the class described, a main supporting frame, traction wheels supporting said frame, a tilting body mounted upon the supporting frame and having a solid bottom, rollers detachably mounted at opposite ends of the body in the plane of the bottom thereof, an endless conveyer trained over said rollers and having friction rollers working upon said bottom, a detachable spreader roller journaled in said body at its discharge end, radially projecting fingers carried by said spreader roller, regulating plates mounted at the discharge end of the body, manually operable means for adjusting the plates, a ground wheel operating said spreading roller upon the tilting of the body, connections between the spreader roller and one of the conveyer rollers, a detachable shield plate mounted at the discharge end of the body, manually operable means for raising and lowering the body, and means normally locking the body in a lowered position.

In testimony whereof, I affix my signature, in presence of two witnesses.

GEORGE W. BARROW.

Witnesses:
J. S. COTNER,
HETTIE HENDIX.